United States Patent [19]
Connely

[11] 4,285,527
[45] Aug. 25, 1981

[54] HEAD GASKET ASSEMBLY WITH METAL INLAYS

[75] Inventor: Terrence T. Connely, Southgate, Mich.

[73] Assignee: Ex-Cell-O Corporation, Troy, Mich.

[21] Appl. No.: 143,620

[22] Filed: Apr. 25, 1980

[51] Int. Cl.³ .............................................. F16J 15/06
[52] U.S. Cl. ................................ 277/235 B; 277/234
[58] Field of Search ................... 277/229, 234, 235 R, 277/235 A, 235 B, 236

[56] References Cited

U.S. PATENT DOCUMENTS

| | | | |
|---|---|---|---|
| 2,753,199 | 7/1956 | Victor | 277/235 B X |
| 3,191,950 | 6/1965 | Hiltner | 277/235 R X |
| 3,606,361 | 9/1971 | Pohl et al. | 277/235 B |
| 4,121,846 | 10/1978 | Skrycki | 277/235 R |

FOREIGN PATENT DOCUMENTS

| | | | |
|---|---|---|---|
| 1278321 | 6/1972 | United Kingdom | 277/235 B |
| 1501373 | 2/1978 | United Kingdom | 277/1 |

Primary Examiner—Robert S. Ward, Jr.
Attorney, Agent, or Firm—McGlynn and Milton

[57] ABSTRACT

A head gasket to be disposed between a cylinder head having a combustion chamber therein and a cylinder block having a cylinder therein with a combustion chamber located at least partially outside the diameter of the cylinder and with the chamber insert disposed in the head. The gasket comprises a metal core, resilient material on each side of the core and at least one cylinder opening. Metal inlays are fixedly secured to both sides of the core and extend completely about the cylinder openings. The inlays include integral extensions extending from the cylinder openings and in engagement with the metal core for engaging the chamber insert and cylinder block to perfect a seal therebetween.

7 Claims, 4 Drawing Figures

HEAD GASKET ASSEMBLY WITH METAL INLAYS

BACKGROUND OF THE INVENTION

1. Field of the Invention

The instant invention relates to a head gasket assembly for an engine having a cylinder head which includes a precombustion chamber located at least partially outside the diameter of the cylinder bore.

2. Description of the Prior Art

In diesel engines it is extremely difficult to maintain an effective seal between a cylinder head and a cylinder block where a precombustion chamber is located within the head and outside the diameter of the cylinder bore. Generally, a chamber insert defines a passageway between the precombustion chamber and the cylinder bore. The insert is rarely coplanar with the bottom of the head when assembled or after reaching operating temperature.

Because of tolerances and thermal expansion, it has been very difficult to perfect a seal beneath the insert. In most instances, prior art gaskets include flanges surrounding the cylinder openings which do not extend beyond the cylinder bore sufficiently in order to seal the area below the insert. Forming limitations in making the flanges also inhibit the extension of the flange to below the insert on both surfaces of the gasket. A further problem with prior art gaskets is the disintegration of the resilient gasket material disposed under the precombustion chamber insert due to the extreme heat within the precombustion chamber.

SUMMARY OF THE INVENTION

The instant invention provides a cylinder head gasket assembly adapted to be disposed between a head having a precombustion chamber therein and a cylinder block having a cylinder therein with the precombustion chamber located at least partially outside the diameter of the cylinder. A precombustion chamber insert is disposed in the head and defines the passageway between the precombustion chamber and the main combustion chamber in the cylinder. The gasket comprises body means defining two parallel surfaces adapted to engage and seal the head and the cylinder block. The body means includes a metal core having resilient material on the surfaces thereof and at least one cylinder opening for surrounding the cylinder. The body means also includes metal inlays fixedly secured to both of the surfaces of the core. The inlays extend completely about the cylinder openings and include integral extensions extending from the cylinder openings and in engagement with the metal core for engaging the chamber insert and the cylinder block to perfect a seal therebetween.

PRIOR ART STATEMENT

The prior art most pertinent to the instant invention is represented by U.S. Pat. No. 3,606,361 to Pohl et at. The patent teaches the use of a U-shaped metal shield flanged about the cylinder opening of a head gasket. The flange portion includes coextensive legs extending from the cylinder opening. However, the patent does not teach the extension of the flange to underlie a precombustion chamber insert. Forming limitations would also inhibit the extension of the flange on both sides of the gasket to underlie an insert. Further, the patent does not teach the removing of the resilient material from under the precombustion chamber. Therefore, the Pohl patent does not teach a head gasket assembly which can obtain the sealing properties of the instant invention.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
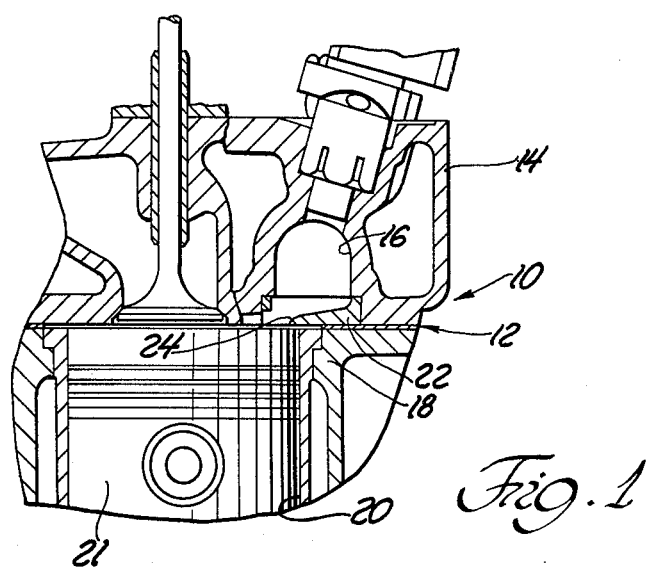
FIG. 1 is a cross-sectional view of a diesel engine showing a head and cylinder block.

A head and cylinder block of a diesel engine is shown generally at 10 in FIG. 1. The subject head gasket assembly generally indicated at 12 is disposed between a head 14 having a precombustion chamber 16 therein and a cylinder block 18 having a cylinder 20 therein, the cylinder 20 defining the main combustion chamber. The precombustion chamber 16 is located partially outside the diameter of the cylinder 20.

A precombustion chamber insert 22 is disposed in the head and defines a passageway 24 between the precombustion chamber 16 and the cylinder 20. A piston 21 is disposed within the cylinder 20.

Figure 2:
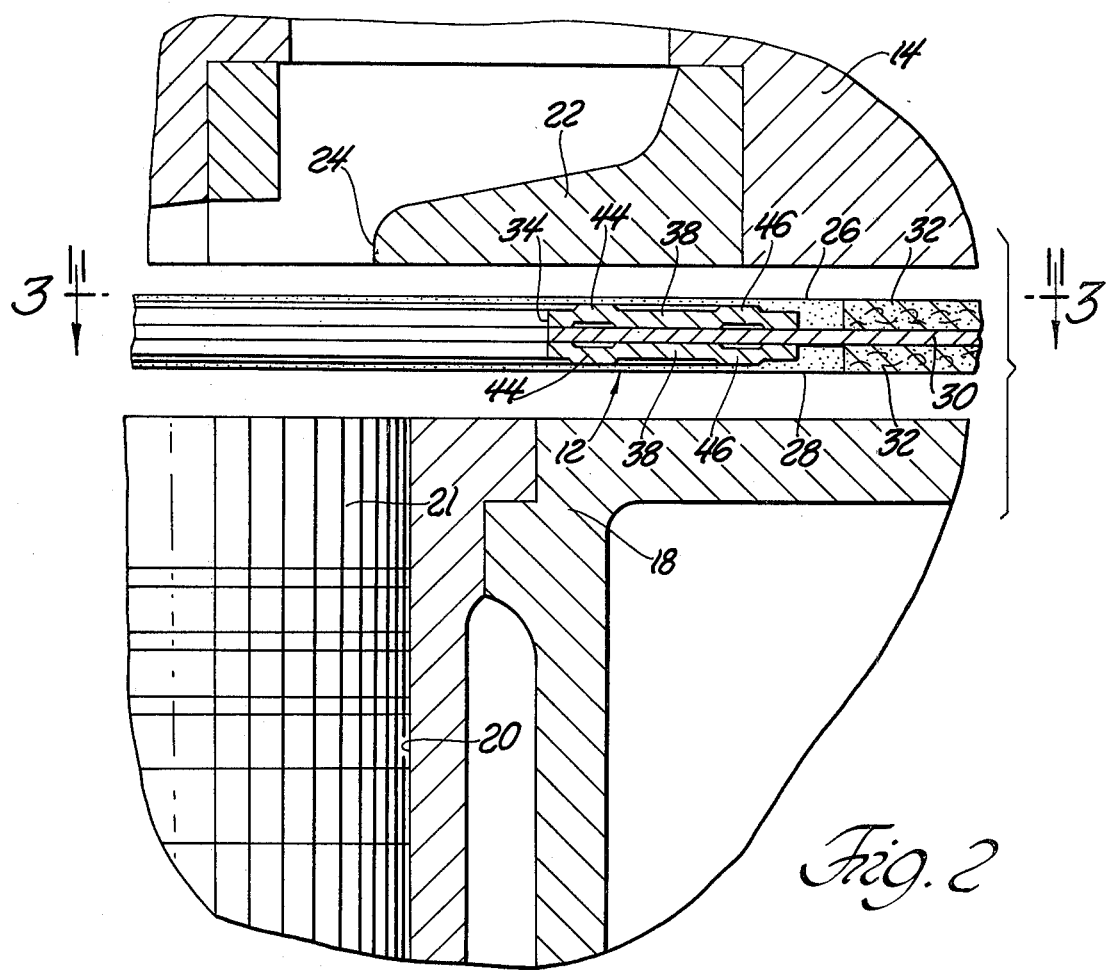
FIG. 2 is an enlarged fragmentary and exploded cross-sectional view of the instant invention disposed between a head and cylinder block.

FIG. 2 shows a head gasket assembly generally indicated at 12 constructed in accordance with the instant invention. The gasket assembly 12 includes body means defining two parallel surfaces 26 and 28 adapted to engage and seal the head 14 and cylinder block 18. The body means includes a metal core 30 having resilient material 32 on the surfaces thereof and at least one cylinder opening 34 for surrounding the cylinder 20. The resilient material 32 may be a fiber, an elastomeric or a mixture of the two.

Figure 3:
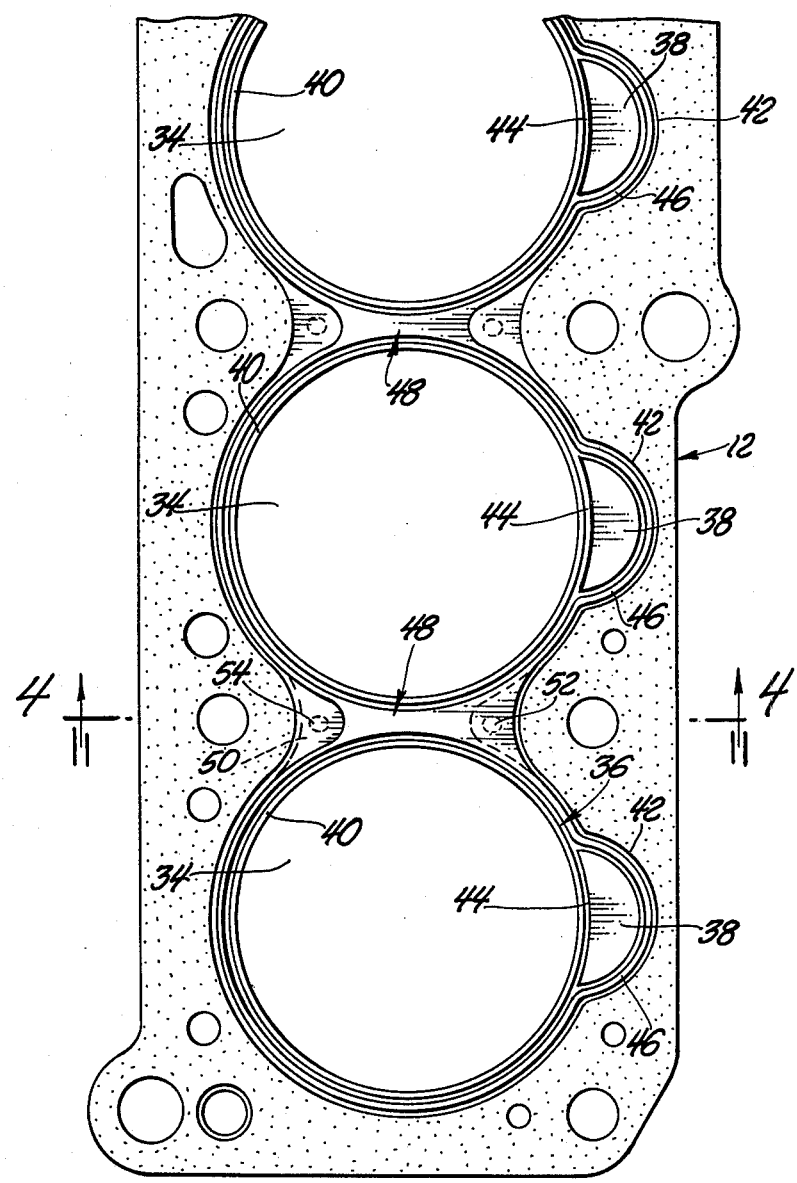
FIG. 3 is a plan view of a preferred embodiment of the gasket assembly of the instant invention taken along lines 3—3 of FIG. 2.
Figure 4:
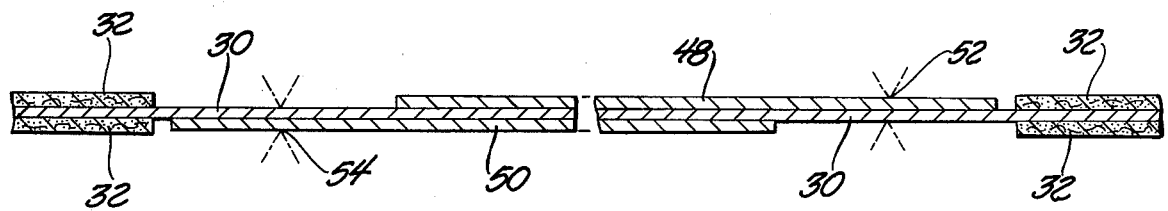
FIG. 4 is a cross-sectional view of the instant invention taken along lines 4—4 of FIG. 3.

FIG. 3 is an enlarged view of the preferred embodiment of the instant invention. The preferred embodiment includes a plurality of cylinder openings 34. Metal inlays generally indicated at 36 are fixedly secured to both of the surfaces of the core 30 (as shown in FIG. 4). The inlays 36 extend completely about the cylinder openings 34. Integral extensions 38 extend from the inlays 36 about the cylinder openings 34 and are in engagement with the metal core 30. As shown in FIG. 2, the integral extension 38 engages both the chamber insert 22 and the cylinder block 18 to perfect a seal therebetween. In other words, the resilient material 32 disposed about the core 30 extends up to but not underneath the metal inlays 36. The extensions 38, integral with the metal inlays 36, extend from the diameter of the cylinder openings 34 to lie beneath the chamber insert 22. Clamping of the cylinder head 14 onto the cylinder block 18 of the engine results in engagement of the integral extension 38 with both the cylinder block 18 and the precombustion chamber insert 22. Therefore, the gasket seals the areas between the head 14 and cylinder block 18 and the area beneath the precombustion chamber insert 22.

As shown in FIG. 3, the metal inlays 36 define coextensive circular portions 40 directly adjacent the cylinder openings 34 thereby defining a diameter thereabout on both of the surfaces of the core 30. The integral extensions 38 extend beyond the diameter so as to underlie the precombustion chamber insert 22 and engage the cylinder block 18 therebeneath, as shown in FIG. 2.

Referring to FIG. 3, the integral extensions 38 have at least in part a circular periphery 42.

The metal inlays 36 include at least one embossment 44 extending completely about each of the cylinder openings. The integral extensions 38 include embossments 46 about the periphery 42. The embossments 44 about the diameter of the cylinder opening 34 are continuous with the embossments 46 about the periphery 42 of the integral extension 38. As shown in FIG. 2, the embossments 44 and 46 surround and support the precombustion insert, therefore, there is an all metal seal providing support under the insert 22. In other words, there are two seals, embossment 44 and 46 beneath the chamber insert 22. Also, there is no resilient gasket material 32 beneath the chamber insert 22.

As shown in FIG. 3, the metal inlays 36 include bridge portions 48 and 50 for integrally connecting at least two of the circular portions 40. FIG. 4 shows the bridge portion 48 and 50 to include welds 52 and 54 securing each of the bridge portions, and therefore, the metal inlays 36 to the adjacent surfaces of the core 30. In other words, the resilient material 32 coextensively extends up to the bridge portions 48 and 50. Bridge portion 48 is welded to the core 30 at 52. Bridge portion 50 is devoid about the weld 52. Similarly, bridge portion 50 is welded to the core 30 at 54. Bridge portion 48 is devoid about weld 54. Other embodiments of the bridge portions 48 and 50 can be constructed such that the bridge portions extend beyond welds 52 and 54. Such a construction would be where bridge 50 would include a bore therein at 52 to allow for spot welding of bridge 48 to core 30 at 52. Also, instead of welds, other fastening means, such as rivets, may be used in substitution for the welds to secure the parts together.

The gasket assembly 12 as shown in FIG. 3 includes bolt holes, coolant openings, and valve push rod openings which are common to and specified for specific diesel engines.

The instant invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A head gasket assembly adapted to be disposed between a head having a precombustion chamber therein and a cylinder block having a cylinder therein with the precombustion chamber located at least partially outside the diameter of the cylinder and with a precombustion chamber insert disposed in the head for defining the passageway between the precombustion chamber and the cylinder, said gasket comprising; body means defining two parallel surfaces adapted to engage and seal the head and the cylinder block, said body means including a metal core having resilient material on said surfaces thereof and at least one cylinder opening for surrounding the cylinder, metal inlays fixedly secured to both of said surfaces of said core and extending completely about said cylinder openings and including integral extensions extending from said cylinder openings and in engagement with said metal core for engaging the chamber insert and the cylinder block to perfect a seal therebetween.

2. An assembly as set forth in claim 1 wherein said metal inlays define coextensive circular portions directly adjacent said cylinder openings and define a diameter thereabout on both of said surfaces of said core, said integral extensions extending beyond said diameter so as to underlie the chamber insert and engage the cylinder block therebeneath.

3. An assembly as set forth in claim 2 wherein said integral extensions have at least in part a circular periphery.

4. An assembly as set forth in claim 3 wherein said inlays include at least one embossment extending completely about each of said cylinder openings.

5. An assembly as set forth in claim 4 wherein said integral extensions include embossments about said periphery of said extensions, said embossments about said diameter of said cylinder openings being continuous with said embossments about said periphery of said extensions.

6. An assembly as set forth in claim 5 wherein said metal inlays include bridge portions for integrally connecting at least two of said circular portions.

7. An assembly as set forth in claim 6 wherein each of said bridge portions of each of said metal inlays include fastening means securing each of said metal inlays to the adjacent surface of said core, said bridge portions adjacent said opposite surface of said core being devoid about said fastening means.

* * * * *